(12) United States Patent
Sanders

(10) Patent No.: US 7,276,290 B2
(45) Date of Patent: Oct. 2, 2007

(54) CRYOGENIC INSULATION

(75) Inventor: Stuart Alan Sanders, Palm Beach Gardens, FL (US)

(73) Assignee: United Technologies Corporation, Hartford, CT (US)

( * ) Notice: Subject to any disclaimer, the term of this patent is extended or adjusted under 35 U.S.C. 154(b) by 370 days.

(21) Appl. No.: 10/927,978

(22) Filed: Aug. 27, 2004

(65) Prior Publication Data

US 2006/0047024 A1 Mar. 2, 2006

(51) Int. Cl.
*B32B 25/20* (2006.01)

(52) U.S. Cl. .................... 428/447; 524/588; 528/43

(58) Field of Classification Search ................. 428/447; 524/588; 528/43
See application file for complete search history.

(56) References Cited

U.S. PATENT DOCUMENTS

| 3,392,864 | A | * | 7/1968 | Perkins, Jr. ............ 220/560.12 |
| 4,332,631 | A | * | 6/1982 | Herty et al. ................ 149/19.2 |
| 4,542,067 | A | * | 9/1985 | Yamamoto et al. ........... 442/81 |
| 4,722,943 | A | * | 2/1988 | Melber et al. ................. 521/57 |
| 4,774,118 | A |   | 9/1988 | Davis et al. |
| 5,202,362 | A | * | 4/1993 | Hermele ..................... 523/218 |
| 5,214,074 | A | * | 5/1993 | Takahashi et al. ............ 521/88 |
| 6,627,697 | B2 |  | 9/2003 | Barney et al. |
| 2003/0152703 | A1 | * | 8/2003 | Hammond et al. ......... 427/256 |
| 2003/0203149 | A1 | * | 10/2003 | Allen et al. .................... 428/69 |

\* cited by examiner

*Primary Examiner*—Kuo-Liang Peng
(74) *Attorney, Agent, or Firm*—Tracey R. Loughlin

(57) ABSTRACT

Putty-like gap-filling compounds for insulation that can be utilized at temperatures from about −420° F. (−250° C.) up to about 500° F. (260° C.) are described herein. Embodiments of these compounds contain about 25-50 volume percent base material, about 50-75 volume percent microspheres, and about 0.1-0.3 volume percent catalyst. Embodiments of these compounds contain about 70-80 weight percent base material, about 20-30 weight percent microspheres, and about 0.1-0.5 weight percent catalyst.

26 Claims, 1 Drawing Sheet

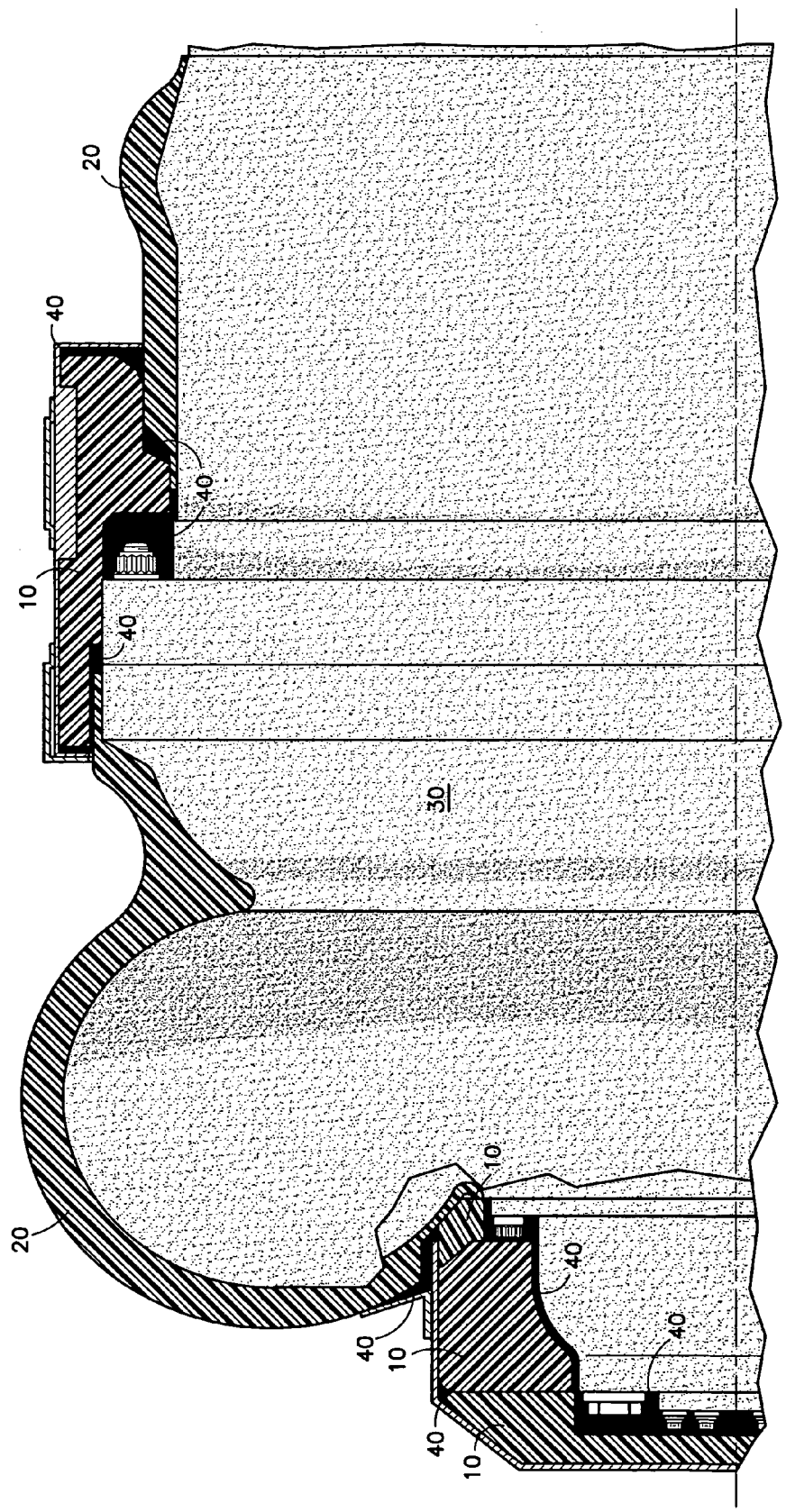

CRYOGENIC INSULATION

STATEMENT REGARDING FEDERALLY SPONSORED RESEARCH OR DEVELOPMENT

The U.S. Government may have certain rights in this invention pursuant to Contract Number NAS8-36801 with the National Aeronautics and Space Administration.

FIELD OF THE INVENTION

The present invention relates generally to insulation systems. More specifically, the present invention relates to putty-like gap-filling compounds useful in cryogenic insulation systems for preventing liquid air formation and icing within, on, or around the cryogenic insulation systems.

BACKGROUND OF THE INVENTION

The Space Shuttle Main Engine (SSME) is fueled by liquid hydrogen, which is maintained within the fuel system at a temperature of about −420° F. (−250° C.). This extremely cold internal temperature creates external surface temperatures on the fuel system and hardware (i.e., housings, ducts, joints, etc.) that are sufficiently cold to cause supercooling of the surrounding air, which forms liquid air. This liquid air may run off onto sensitive electronic sensors, or be cryopumped into restricted cavities, both of which can cause numerous operational problems. Therefore, to prevent this liquid air from forming during operation, the exterior surfaces of the SSME fuel system and hardware are typically insulated with liquid air insulation systems.

Current liquid air insulation systems utilize loose-fitting pieces of polyurethane foam assembled around complex-geometry subsystem components that must remain accessible for interim maintenance. These foam pieces are held together by a one-piece sealed cover, called a boot. When maintenance is necessary, the boot can be removed from around the foam pieces, and then the foam pieces can be easily removed. These foam pieces are not made to precisely fit many small details they surround (i.e., bolt heads, plumbing lines, pressure taps, etc.) because to do so would be cost prohibitive, and would complicate the manufacture and installation of the foam pieces considerably. As such, once installed, gaps exist between adjacent foam pieces, and between the foam pieces and the underlying metal components. These gaps are a potential source of, and/or collecting place for, liquid air.

It was initially thought that these gaps would not pose any problems, since any liquid air created therein would be trapped within the boot. However, it has recently been discovered that if any liquid air created by these gaps pools in critical locations, the resultant temperature of the external surface of the liquid air insulation system could fall below the condensation temperature, thereby allowing liquid air or ice to form outside thereof. This would be undesirable, and could create extremely hazardous conditions.

Therefore, it would be desirable to fill the gaps that currently exist between and around the foam pieces in liquid air insulation systems to eliminate these sources of liquid air. It would also be desirable to facilitate easy application of the gap-filling compound as the foam pieces are being assembled so that the gaps can be easily identified and filled. It would be further desirable to have a putty-like gap-filling compound for filling these gaps, so that the compound stays where it is applied.

SUMMARY OF THE INVENTION

The above-identified shortcomings are overcome by embodiments of the present invention. Embodiments of this invention comprise putty-like gap-filling compounds that are capable of being utilized at temperatures from about −420° F. (−250° C.) up to about 500° F. (260° C.). These compounds generally comprise a pliable base material, microspheres, and a catalyst, and may also comprise other inert fillers.

DESCRIPTION OF THE DRAWING

Embodiments of the present invention are described herein below with reference to the FIGURE, which is a schematic diagram showing a cross-sectional view of a portion of a SSME fuel turbopump surrounded by foam insulation pieces, wherein the gaps therein are filled with a putty-like gap-filling compound of this invention.

DETAILED DESCRIPTION OF THE INVENTION

For the purposes of promoting an understanding of the invention, reference will now be made to some embodiments of this invention as illustrated in the FIGURE and specific language used to describe the same. The terminology used herein is for the purpose of description, not limitation. Specific structural and functional details disclosed herein are not to be interpreted as limiting, but merely as a basis for teaching one skilled in the art to variously employ the present invention. Any modifications or variations in the depicted structures and methods, and such further applications of the principles of the invention as illustrated herein, as would normally occur to one skilled in the art, are considered to be within the spirit and scope of this invention as described and claimed.

This invention relates to putty-like gap-filling compounds and methods for making and using same. These putty-like gap-filling compounds may be useful for filling gaps in existing liquid air insulation systems, among other things. These putty-like gap-filling compounds typically comprise three main components: (1) a base material; (2) microspheres; and (3) a catalyst. Other inert fillers (i.e., calcium carbonate, silicon dioxide, zinc oxide, etc.) may be used to control handling and workability characteristics of these compounds, if desired. These inert fillers may be added separately, or they may be included as part of the base material.

In embodiments, the composition of the putty-like gap-filling compound comprises about 25-50 volume percent base material; about 50-75 volume percent microspheres; and about 0.1-0.3 volume percent catalyst. In embodiments, the composition of the putty-like gap-filling compound comprises about 70-80 weight percent base material; about 20-30 weight percent microspheres; and about 0.1-0.5 weight percent catalyst.

The base material serves as a binder for the microspheres, and is a primary contributor to the low temperature resilience of the insulation. The base material may comprise any suitable material, and in embodiments, may comprise an elastomeric material such as a room temperature vulcanizing (RTV) silicone rubber compound such as a poly(phenylmethyl)siloxane or poly(diphenyl)siloxane compound, which have the lowest temperature capability of the RTV family. Such silicone rubbers may comprise a two-part addition or condensation cure type to facilitate mixing and storage stability. In embodiments, the glass transition temperature or brittle point temperature of the base material may be about −150° F. (−101° C.) or below.

The microspheres are the primary contributor to the reduced thermal conductivity of the insulation, and are generally used to increase the uncured viscosity of the base material and reduce the overall density of the insulation. The microspheres may comprise any suitable material, such as, for example, glasses, ceramics, phenolics, polyimides, acrylics, polyesters, and/or combinations thereof, etc. In embodiments, the microspheres may be hollow to impart low density and low thermal conductivity to the insulation. They may have a diameter of about 10-100 microns (preferably about 50 microns in some embodiments), a wall thickness of about 1-2 microns, and a density of about 0.1-0.3 g/cc (0.004-0.01 lb/in$^3$). In embodiments, the microspheres are rigid and have a smooth surface, which facilitates optimal handling characteristics when mixed with the base material. The microspheres should be chemically compatible with the base material (i.e., be non-detrimental to the properties and cure characteristics of the base material). These microspheres are commercially available in a variety of sizes and compositions, each of which can influence the mechanical strength, thermal conductivity and physical characteristics of the insulation.

The catalyst may comprise any suitable material that is capable of curing the base material. In embodiments, the catalyst may comprise a liquid dibutyl tin dilaurate (DBT) catalyst that has a slow to moderate cure. Other metal soap-based catalysts may also be used, such as, for example, stannous tin octoate (STO).

In embodiments, the viscosity of the base material may be approximately 5,000-10,000 poise, which is similar in consistency to toothpaste. In these embodiments, after the microspheres are added to the base material, the viscosity of the mixture is approximately 500,000-1,000,000 poise, which is similar in consistency to putty or dough. Once the catalyst is added, the putty-like gap-filling compound can be easily applied in any orientation into the gaps between and around the foam pieces insulating the SSME fuel system without rapidly draining therefrom. It may be desirable to have different viscosities in other embodiments, or if these putty-like gap-filling compounds are used for other purposes.

Some have proposed filling these gaps with a liquid silicone rubber compound (i.e., RTV 511 or any other silicone rubber compound having a base viscosity of about 50-500 poise). However, the putty-like gap-filling compounds of this invention are superior to liquid gap-filling compounds. First, liquid gap-filling compounds are more difficult to use than putty-like gap-filling compounds. Liquid gap-filling compounds must be pneumatically or hydraulically pumped into a pre-assembled liquid air insulation system after the foam pieces and the boot are completely assembled. This requires special equipment, and poses a greater risk of contamination. While silicones generally have low human toxicity, they have great potential for cross-contaminating other manufacturing or field repair processes, especially those involving adhesive bonding. Furthermore, because the liquid air insulation system must be pre-assembled before the liquid gap-filling compound can be applied, the end product cannot be easily inspected to verify that all the gaps therein have been filled. Second, once cured, the liquid gap-filling compounds (which do not contain microspheres) are denser than the putty-like gap-filling compounds of this invention. Because a denser gap-filler has a higher thermal conductivity than the surrounding foam pieces and the air being displaced, the overall liquid air insulation system conductivity may be adversely affected. While liquid compounds may prevent liquid air formation within the liquid air insulation system, direct conduction of liquid air from the internal cold surfaces of the liquid air insulation system to the outside of the liquid air insulation system through the denser gap-filled pathway may still pose a problem.

The putty-like gap-filling compounds of this invention overcome both of these problems in various ways. These putty-like gap-filling compounds are hand-workable, and do not require any special equipment for mixing or application. Additionally, these putty-like gap-filling compounds can be applied during installation of the foam pieces, allowing for easy visual verification of complete gap filling during assembly of the foam pieces, before the boot is installed thereover. Furthermore, by providing a more easily containable material form, these putty-like gap-filling compounds provide greater control over the risks of exposure to personnel and cross-contamination of other manufacturing or field repair processes. Moreover, these putty-like gap-filling compounds have a low thermal conductivity due to the microspheres therein.

In embodiments, the putty-like gap-filling compounds of this invention are made by mixing the base material and the microspheres together without the catalyst to form a silicone putty-like prepolymer that is stable at room temperature. To facilitate storage and usage of the putty-like gap-filling compounds of this invention, this base material/microsphere mixture can be mixed ahead of time and stored separately from the catalyst, and then be mixed with the catalyst just prior to application. Alternatively, these putty-like gap-filling compounds may be mixed by placing the base material in a container and adding the microspheres thereto. Thereafter, the catalyst can be added, and the mixture can be thoroughly mixed to ensure that the mixture is fully catalyzed. After addition of the catalyst, the mixture is a semi-solid, putty-like moldable gap-filling compound that can be easily applied to conform to and fill the volume of the gaps between mating foam pieces and surrounding surfaces. Upon curing, the putty-like moldable gap-filling compound becomes a semi-rigid, cryogenic insulation, which prevents movement of the compound or shifting of the foam pieces during operation of the SSME or other apparatus.

The putty-like gap-filling compounds of this invention, once cured, form cryogenic insulation, filling the gaps between and around the foam pieces in existing liquid air insulation systems. In embodiments, the cryogenic insulation of this invention is strain-compatible with the foam pieces, the metal of the SSME fuel tank, and the associated hardware, so as not to fracture or delaminate therefrom. Such fracture or delamination could create conduit pathways for cryopumping of outside air to cold surfaces within, which can lead to potential pockets of liquid air.

These putty-like gap-filling compounds were prepared and applied to several SSME fuel turbopumps for use as gap-filling cryogenic insulation. As shown in the FIGURE, the putty-like gap-filling compound 40 was applied to various gaps surrounding loose insulation 10, fixed insulation 20, and housings 30. The base material used in this sample was a room-temperature vulcanizing silicone rubber compound, poly(phenylmethyl)siloxane, which is a blend of RTV 511/577 available from General Electric Silicones. The glass microspheres were high purity silica microspheres (≧95 weight % silica), Eccospheres® Type SI silica microspheres, available from Emerson & Cuming Composite Materials, Inc. The catalyst was dibutyl tin dilaurate (DBT)

curing agent, available from General Electric Silicones. The composition of this putty-like gap-filling compound comprised about 74.25 weight percent poly(phenylmethyl)siloxane; about 25.55 weight percent Eccospheres® Type SI glass microspheres; and about 0.20 weight percent dibutyl tin dilaurate. In this embodiment, the base material and glass microspheres were mixed together without the catalyst to form a silicone putty-like prepolymer that is stable at room temperature. This silicone putty-like prepolymer was then mixed with the catalyst just prior to application of this gap-filling composition to the SSME fuel turbopumps. Testing indicated that high purity silica microspheres, ≧95% silica, should be used. Lower purity silica microspheres were tried, but they did not work. The elemental impurities in the lower purity silica microspheres apparently caused premature curing of the composition, even in the absence of a catalyst.

As described above, this invention provides improved liquid air insulation systems for use in environments from about −420° F. (−250° C.) up to about 500° F. (260° C.). Advantageously, the putty-like gap-filling compounds of this invention may be utilized to insulate SSME fuel systems and hardware to prevent liquid air formation and icing on spacecraft. These putty-like gap-filling compounds are easy to make and apply, and allow gaps in such systems to be easily identified and filled. Many other embodiments and advantages will be apparent to those skilled in the relevant art.

Various embodiments of this invention have been described in fulfillment of the various needs that the invention meets. It should be recognized that these embodiments are merely illustrative of the principles of various embodiments of the present invention. Numerous modifications and adaptations thereof will be apparent to those skilled in the art without departing from the spirit and scope of the present invention. For example, while the putty-like gap-filling compounds of this invention have been described for use in liquid air insulation systems on spacecraft, they could also be used for various other applications, such as for insulating other cryogenic gas or liquid systems, or for insulating joints in cryogas or cryoliquid production facilities, etc. Thus, it is intended that the present invention cover all suitable modifications and variations as come within the scope of the appended claims and their equivalents.

What is claimed is:

1. A liquid air insulation system comprising:
   a plurality of foam insulation pieces substantially filling a predetermined area; and
   a gap-filling compound filling predetermined gaps between adjacent foam insulation pieces and between foam insulation pieces and adjacent components,
   wherein the gap filling compound comprises:
      about 70-80 weight percent base material;
      about 20-30 weight percent microspheres; and
      about 0.1-0.5 weight percent catalyst,
   wherein the gap-filling compound is capable of being utilized at temperatures from about −420° F. (−250° C.) up to about 500° F. (260° C.).

2. The liquid air insulation system of claim 1, wherein the base material has a viscosity of about 5,000-10,000 poise.

3. The liquid air insulation system of claim 1, wherein the gap-filling compound has a viscosity of about 500,000-1,000,000 poise after it is mixed and before it cures.

4. The liquid air insulation system of claim 1, wherein the base material comprises a room temperature vulcanizing (RTV) silicone rubber compound based on at least one of poly(phenylmethyl)siloxane and poly(diphenyl)siloxane.

5. The liquid air insulation system of claim 1, wherein the gap-filling compound further comprises at least one inert filler.

6. The liquid air insulation system of claim 5, wherein the at least one inert filler comprises at least one of calcium carbonate, silicon dioxide, and zinc oxide.

7. The liquid air insulation system of claim 1, wherein the base material comprises a glass transition temperature of about −150° F. (−101° C.) or below.

8. The liquid air insulation system of claim 1, wherein the gap-filling compound comprises about 25-50 volume percent base material.

9. The liquid air insulation system of claim 1, wherein the microspheres comprise at least one of: a glass, a ceramic, a phenolic, a polyinide, an acrylic, a polyester, and combinations thereof.

10. The liquid air insulation system of claim 1, wherein the microspheres comprise high purity silica microspheres comprising at least about 95 weight percent silica.

11. The liquid air insulation system of claim 1, wherein the microspheres comprise an average diameter of about 10-100 microns.

12. The liquid air insulation system of claim 1, wherein the microspheres are hollow.

13. The liquid air insulation system of claim 12, wherein the microspheres comprise a wall thickness of about 1-2 microns.

14. The liquid air insulation system of claim 1, wherein the microspheres comprise a density of about 0.1-0.3 g/cc.

15. The liquid air insulation system of claim 1, comprising about 50-75 volume percent microspheres.

16. The liquid air insulation system of claim 1, wherein the catalyst comprises at least one of dibutyl tin dilaurate and stannous tin octoate.

17. The liquid air insulation system of claim 1, comprising about 0.1-0.3 volume percent catalyst.

18. The liquid air insulation system of claim 1, wherein the system is used in at least one of: a cryogenic gas system, a cryogenic liquid system, a cryogenic gas production system, and a cryogenic liquid production system.

19. The liquid air insulation system of claim 1, wherein the gap-filling compound comprises about 70-80 weight percent poly(phenylmethly)siloxane; about 20-30 weight percent high purity silica microspheres comprising at least about 95 weight percent silica; and about 0.1-0.5 weight percent dibutyl tin dilaurate.

20. A gap-filling compound comprising:
    about 70-80 weight percent poly(phenylmethyl)siloxane;
    about 20-30 weight percent high purity silica microspheres comprising at least about 95 weight percent silica; and
    about 0.1-0.5 weight percent dibutyl tin dilaurate.

21. The gap-filling compound of claim 20, wherein the gap-filling compound is capable of operating at temperatures of about −420° F. (−250° C.) to about 500° F. (260° C.) and is used in at least one of: a liquid air insulation system, a cryogenic gas system, a cryogenic liquid system, a cryogenic gas production system, and a cryogenic liquid production system.

22. A liquid air insulation system comprising:
    a plurality of foam insulation pieces substantially filling a predetermined area around a cryogenic fuel system;
    a gap-filling compound filling predetermined gaps between adjacent foam insulation pieces and between foam insulation pieces and adjacent components of a cryogenic fuel system,
wherein the gap filling compound comprises:
about 70-80 weight percent base material;
about 20-30 weight percent microspheres; and
about 0.1-0.5 weight percent catalyst,
wherein the gap-filling compound is capable of being utilized at temperatures from about −420° F. (−250° C.) up to about 500° F. (260° C.).

23. The liquid air insulation system of claim 22, wherein the gap-filling compound comprises about 70-80 weight percent poly(phenylmethyl)siloxane; about 20-30 weight percent high purity silica microspheres comprising at least about 95 weight percent silica; and about 0.1-0.5 weight percent dibutyl tin dilaurate.

24. A gap-filling compound comprising:
about 25-50 volume percent base material comprising a room temperature vulcanizing (RTV) silicone rubber compound based on at least one of poly(phenyhnethyl)siloxane and poly(diphenyl)siloxane;
about 50-75 volume percent microspheres; and
about 0.1-0.3 volume percent catalyst, wherein the gap-filling compound is capable of being utilized at temperatures from about −420° F. (−250° C.) up to about 500° F. (260° C.).

25. The gap-filling compound of claim 24, wherein the microspheres comprise at least one of: a glass, a ceramic, a phenolic, a polyimide, an acrylic, a polyester, and combinations thereof.

26. The gap-filling compound of claim 24, wherein the catalyst comprises at least one of dibutyl tin dilaurate and stannous tin octoate.

* * * * *